United States Patent [19]

Rese

[11] Patent Number: 4,775,105

[45] Date of Patent: Oct. 4, 1988

[54] ELECTROSTATIC POWDER SPRAY GUN

[75] Inventor: Arkadijus Rese, Trübbach, Switzerland

[73] Assignee: Wagner International AG, Switzerland

[21] Appl. No.: 34,208

[22] Filed: Apr. 2, 1987

[30] Foreign Application Priority Data

Apr. 4, 1986 [DE] Fed. Rep. of Germany ....... 3644840

[51] Int. Cl.[4] .......................... B05B 5/00; B05B 9/00; A62C 31/02; G01F 11/00

[52] U.S. Cl. .................................... 239/704; 222/278; 239/143; 239/289; 239/325; 239/346; 239/397

[58] Field of Search ............... 239/143, 289, 325, 346, 239/397, 698, 704–708; 222/278, 288

[56] References Cited

U.S. PATENT DOCUMENTS

| | | | |
|---|---|---|---|
| 1,104,217 | 7/1914 | Paasche | 239/143 X |
| 1,682,037 | 8/1928 | Craig | 239/373 X |
| 2,228,861 | 1/1941 | Wegener | 222/325 |

FOREIGN PATENT DOCUMENTS

| | | | |
|---|---|---|---|
| 1453503 | 6/1969 | Fed. Rep. of Germany | 239/708 |

*Primary Examiner*—Andres Kashnikow
*Assistant Examiner*—Patrick N. Burkhart
*Attorney, Agent, or Firm*—Hill, Van Santen, Steadman & Simpson

[57] ABSTRACT

An electrostatic powder spray gun comprises a powder cup and is constructed such that the powder cup comprises a removable cover which is secured to the pistol tube of the gun in an easily-detachable manner, whereby a conveying tube and an air tube extend through the cover and are held thereat. The air tube projects beyond the cover and, given the cover secured to the pistol tube, projects into a spring-loaded discharge valve of the compressed air feed line and thereby holds the same in the open position against spring pressure. Given the cover secured to the pistol tube, the orifice of a powder channel extending in the pistol tube is constructed as a connection for a powder feed line leading from a remote powder preparation system.

10 Claims, 4 Drawing Sheets

ELECTROSTATIC POWDER SPRAY GUN

BACKGROUND OF THE INVENTION

1. Field of the Invention

The present invention relates to an electrostatic powder spray gun comprising a pistol body with a handle and a trigger, as well as connections for compressed air and high voltage. The gun comprises a pistol tube secured to the pistol body and having an electrode located at the front end thereof which is connected to the high voltage terminal via an electrical line passing through the pistol body and the pistol tube. A powder channel is provided for the powder-air mixture to be sprayed which penetrates the pistol tube and discharges towards the outside at the front end thereof. A powder cup, attached to the rear end of the pistol tube and having a conveying tube located therein and entering a bore is provided, whereby the conveying tube connects to the powder channel and the air bore is in communication with the compressed air connection via a compressed air feed line extending in the pistol body and the powder cup comprises a removable cover which is secured to the pistol tube in an easily-detachable manner and is penetrated by the conveying tube.

2. Description of the Prior Art

Powder spray guns of the type generally set forth above have been known for quite some time, for example from the German published application No. 25 14 160, and are commercially available. The advantage of these spray guns is that no separate powder preparation system and no connecting hose from such a system to the spray gun are required because the powder to be sprayed is located in the powder cup attached to the spray gun and is also prepared ready for spraying at that location. Of course, the supply of powder to be accommodated in the powder cup is limited, so that such cup guns are poorly suited in some instances, for example when a great powder throughput or longer spraying times are required, and are replaced by other guns which have a connection to a powder preparation system located at a remote location. Conversely, however, it can also occur that a cup gun would be preferable for special spraying purposes over the existing, cup-free powder gun connected to a remote powder preparation system.

SUMMARY OF THE INVENTION

It is therefore an object of the present invention to provide an electrostatic powder spray gun comprising a powder cup of the type initially set forth such that it can be quickly and simply converted into a cup-free powder gun connectible to a remote powder preparation system, such a gun being therefore suitable both for operation with the attached powder cup and with the remote powder preparation system.

According to the invention, the above object is achieved in a spray gun of the type set forth above which is particularly characterized in that the air bore is an air tube extending through the cover of the supply and secured to the pistol tube, projecting into its spring-loaded discharge valve of the compressed air feed line and thereby holding the same in its open position against spring pressure. With the cover secured to the pistol tube, the orifice of the powder channel lying thereagainst is constructed as a connection for a powder feed line extending from a remote powder preparation system.

According to the invention, therefore, the orifice of the powder channel is exposed after removal of the powder cup which is secured to the pistol tube in an easily-detachable manner and can be connected to a connecting hose of the powder preparation system. At the same time, however, the previously-existing compressed air feed to the powder cup is shut off by removal of the powder cup without requiring a special manipulation on the part of the operator. Conversely, the compressed air feed to the cup is automatically reestablished after removal of the connecting hose and attachment of the powder cup, so that the cup mode can be initiated immediately.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
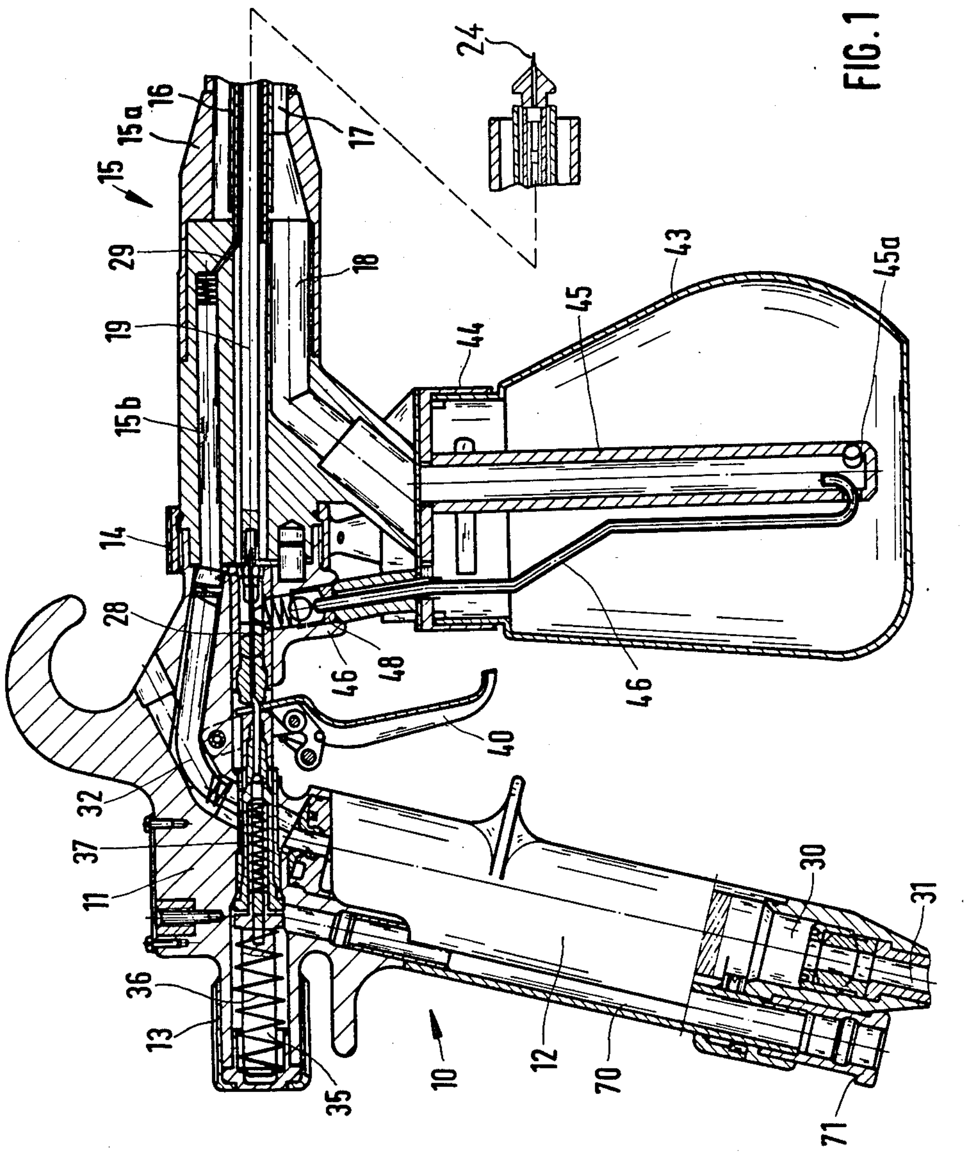
FIG. 1 is a longitudinal view, shown partially in section, of a powder gun with an attached powder cup and constructed in accordance with the present invention.

A powder gun shown in the drawings comprises a base 10 which has the approximate form of a "T", whereby the horizontal portion 11 is a tubular member extending in the spraying direction and a part 12 obliquely departs therefrom in the downward direction and is shaped as a handle. The horizontal tube member 11 is closed at its rear end opposite the spraying direction by a screw-tight cap 13, whereas its forward end is connected to a pistol tube 15 by way of a plug-tight connection and a union nut 14. A coaxial inner tube 16 extends in the forward region **15*a* of the pistol tube 15, which is only partially shown, whereby an annular space 17 between the inner tube 16 and the front pistol tube 15*a* serves for supplying the powder-air mixture to be sprayed from the pistol tube mouth. A channel 18 for the powder-air mixture extends eccentrically in the rear portion 15*b* of the pistol tube 15, the forward side of the channel 18 being in communication with the annular space 17 and is rear end comprising a connection to a feed source for the powder-air mixture, as shall be set forth in greater detail below. A rod 19 is arranged in the rear region of the tube 16. An annular space 27 is provided between the rod 19 and the inner tube 16, the annular space 27 discharging into the open at the mouth of the pistol tube and continuing towards the rear in the form of an annular channel, continuing back into the horizontal portion 11 of the base member 10 up to a seal 28. The annular space 27** serves the purpose of supplying secondary air.

Figure 2:
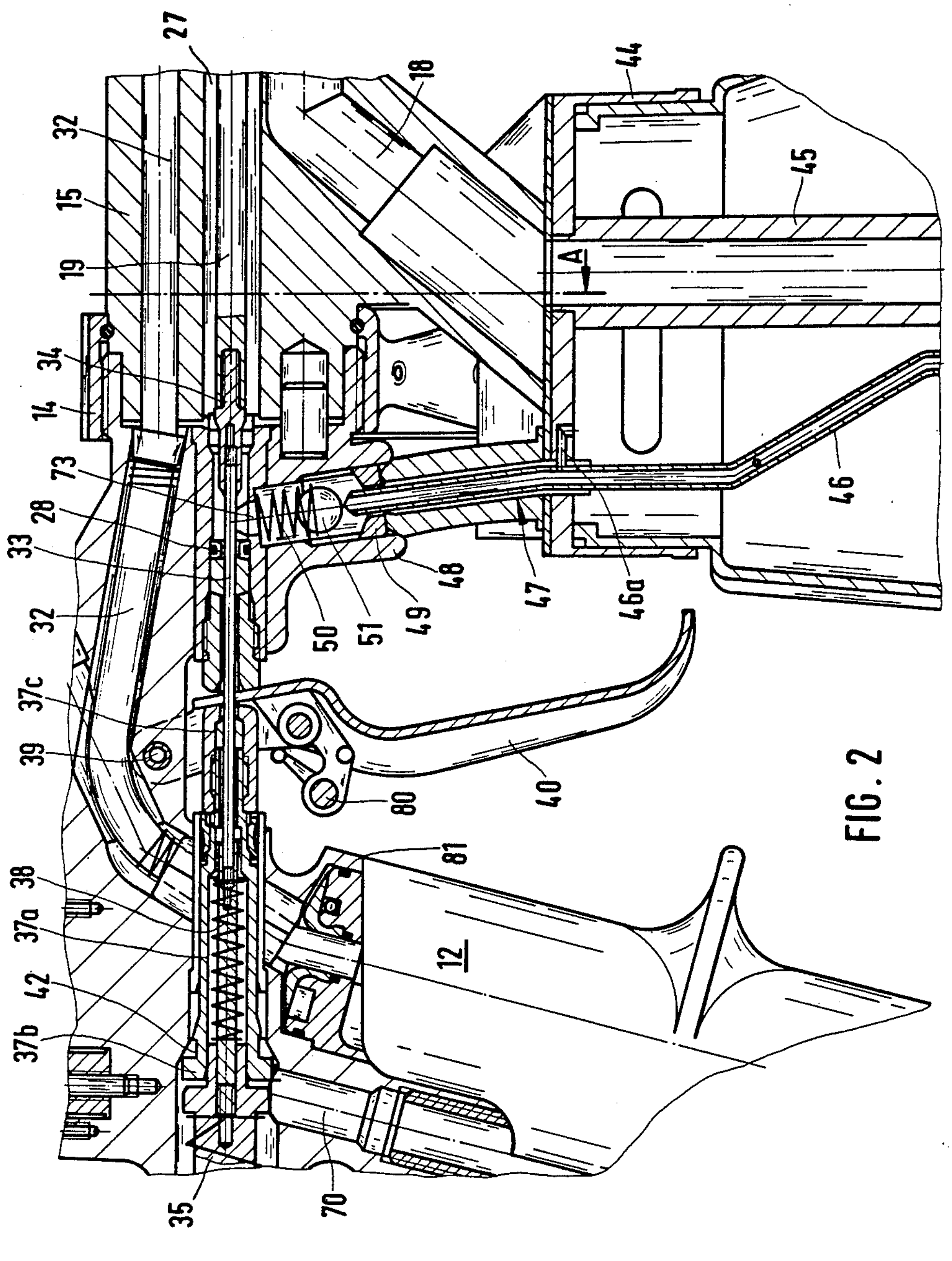
FIG. 2 is an enlarged view of a portion of FIG. 1.

The structure of the base 10 or, respectively, of the component portions integrated therein shall be discussed below, in particular with reference to FIG. 2. Therefore, a high-voltage generator 30 is accommodated in the handle 12, the generator 30 being supplied with a high-frequency low voltage by way of a line 31 and transmitting a rectified high-voltage, generated therein, to an electrical cable 32 whose free end is electrically connected to the aforementioned conductor 29 of the pistol tube 15. An uninterrupted line connection between the output of the high-voltage generator 30 and the needle electrode 24 therefore exists. Furthermore, a rod 33 is seated in an axially displaceable manner in an axial bore of the tube 11, the forward end of the rod 33 being connected by a coupling member 34 to the rear end of the rod 19 and the rear end thereof being screwed into a piston 35 which is urged in the direction toward the forward end by way of a coil spring 36. Furthermore, the rod 33 is loosely surrounded by a sleeve 37 which is constructed as a multi-part sleeve and which is supported against the forward face of the piston 35 by a spring 38. The sleeve 37 is composed of a sleeve tube 37*a* having a rear collar 37*b* and a front tensing or biasing sleeve 37*c* screwed thereto for the purpose of pretensing or biasing the inner and outer seal elements. A trigger 40, pivotally connected at 39, presses, first of all, against the forward face of the sleeve 37 or, respectively, its tensing sleeve 37*c* and, secondly, against an abutment. In the position illustrated in FIG. 2, the trigger 40 is pressed against its abutment 41 by the action of the spring 38 by way of the sleeve 37, whereby a slight distance then exists between the sleeve 37 and the piston 35. A further, somewhat greater distance, is present between the rear end of the piston 35 and the screwable closing cap 13. What is thereby also significant is that the collar 37*b* of the sleeve 37 has its front face pressed against an annular valve seat 42 of the axial bore.

A powder cup 43, which is terminated at the top by a screw-tight cover 44 is illustrated. A conveying tube 45 extending vertically down to the proximity of the floor of the cup 43 is secured to the screw-tight cover, the conveying tube 45 comprising an intake opening 45*a*. An air tube 46 extends through the cover 44 and is also secured thereto, the air tube 46 extending somewhat beyond the cover 44 and discharging into the conveying tube 45 within the cup 43 adjacent to the opening 45*a*. The upper end of the air tube 46, extending beyond the cover 44, is plugged into a connecting nipple 48 at the underside of the tube 11 together with its protective sleeve 47, whereby the nipple 48 comprises an elastic valve seat 49 and a valve ball 51 biased against the valve seat by way of a spring 50. The tip of the inserted air tube 46 thereby presses the valve ball 51 away from the valve sleeve 49 and against the action of the spring 50. A transverse bore 46*a* is also provided in the cover 44, the transverse bore 46*a* being in communication, first of all, with the air tube 46 and, secondly, with the interior of the powder cup 43.

Figure 3:
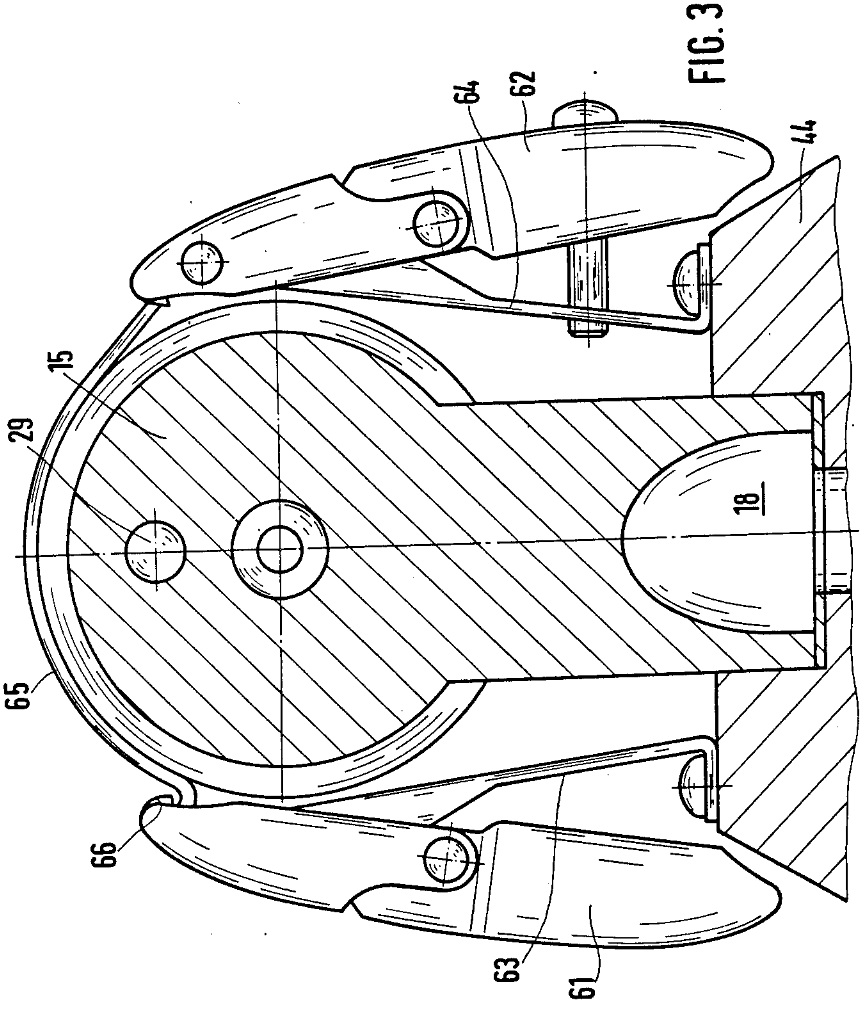
FIG. 3 is a cross sectional view, likewise on an enlarged scale taken along the line A—A of FIG. 2.

The mounting of the powder cup 43 at the powder gun occurs on the basis of two clamp jaws 61 and 62 (see FIG. 3) which are secured to the cover 44 of the powder cup 43 by way of springs 63 and 64 as over-the-center latches . The two jaws 61 and 62 are biased against the pistol tube 15 by the spring 63 and 64 and therefore hold the powder cup 43 fast at the piston tube 15. In addition, the clamp jaw 62 is provided with a spring clip 65 whose free end can be hooked into a recess 66 of the clamp jaw 61 such that the spring clip 65 embraces the upper side of the pistol tube 15. A firm and reliable fastening is thereby guaranteed. It may also be seen from FIG. 3 that the aforementioned channel 18 for the powder-air mixture connects to the upper opening of the conveying tube 45 extending into the powder cup.

Finally, a line 70 with a connecting nipple 71 for compressed air is provided at the rear end of the handle 12, the discharge thereto into the interior of the pistol, however, being closed in the illustrated position, in particular by the collar 37*b* of the sleeve 37 lying against the valve seat 42 and acting as a valve body . When, however, as shall be set forth below, the collar 37*b* moves away from the valve seat 42, then an annular space arises between the two portions, the compressed air supplied from the line 70 being capable of penetrating thereinto. This annular space is in communication with the channel extending essentially parallel to the pistol axis outside of the sectional plane of the drawing, this channel being connected to the annular space 27 located in front of the seal 28, whereby the annular space 27, as mentioned above, leads, first of all, through the entire pistol tube 15 up to its orifice and, secondly, is in communication with the interior of the connection nipple 48 by way of a channel 73.

The powder gun operates in the following manner. Given the position illustrated in the drawing, the trigger 40 has not been actuated, i.e. the powder gun is in its quiescent condition. The valve composed of the collar 37*b* and of the valve seat 42 is blocking the compressed air feed and the high-voltage is also shut off because the magnet 80 located at the trigger 40 is too far away from the magnetic switch 81 of the handle 12 which actuates the voltage multiplier. When the trigger 40 is pulled, i.e. pivoted a short distance about the pivot point 19 in a clock-wise direction as illustrated in FIG. 2, then it pushes the sleeve 37 towards the left against the force of the spring 38 without, however, the collar 37*b* already contacting the front face of the piston 35. The result of this displacement is, first of all, that the magnet 80 switches the high-voltage on due to its approach to the magnetic switch 81, i.e. an electrically-conductive connection to the high-voltage generator 30 by way of the cable 32 and the conductor 29 to a standard spray electrode needle (not shown) at the mouth of the pistol tube is completed. Secondly, the collar 37*b* of the sleeve 37 lifts off from the valve seat 42 so that compressed air from the line 70 flows into the annular space which thereby occurs and flows into the annular space 27 via the channel 24 and proceeds through the annular space 27 up to the mouth of the pistol tube where it emerges towards the exterior . At the same time, however, compressed air proceeds from the channel 47 via the bore 73 into the interior of the connecting nipple 48 and proceeds further into the air tube 46, whereby a small portion of the air flows through the cover bore 46*a* into the upper portion of the cup 43 and thereby whirls the powder located therein, whereby the main portion of the air flows out of the mouth of the air tube 46 located within the conveying tube 45 and vacuums powder located in the powder cup 43 in through the opening 45*a* as a result of injector action and upwardly entrains the powder in the conveying tube 45. The powder-air mixture flowing up in the conveying tube 45 then proceeds into the channel 18 and further proceeds into the channel 17 up to the mouth of the pistol tube.

When the powder cup 43 is empty, then it is detached from its cover 44 by screws, whereby the conveying tube 45 and the air tube 46 remain with the cover 44 and, therefore, at the gun, whereas the cover 43 can be removed and refilled.

Figure 4:
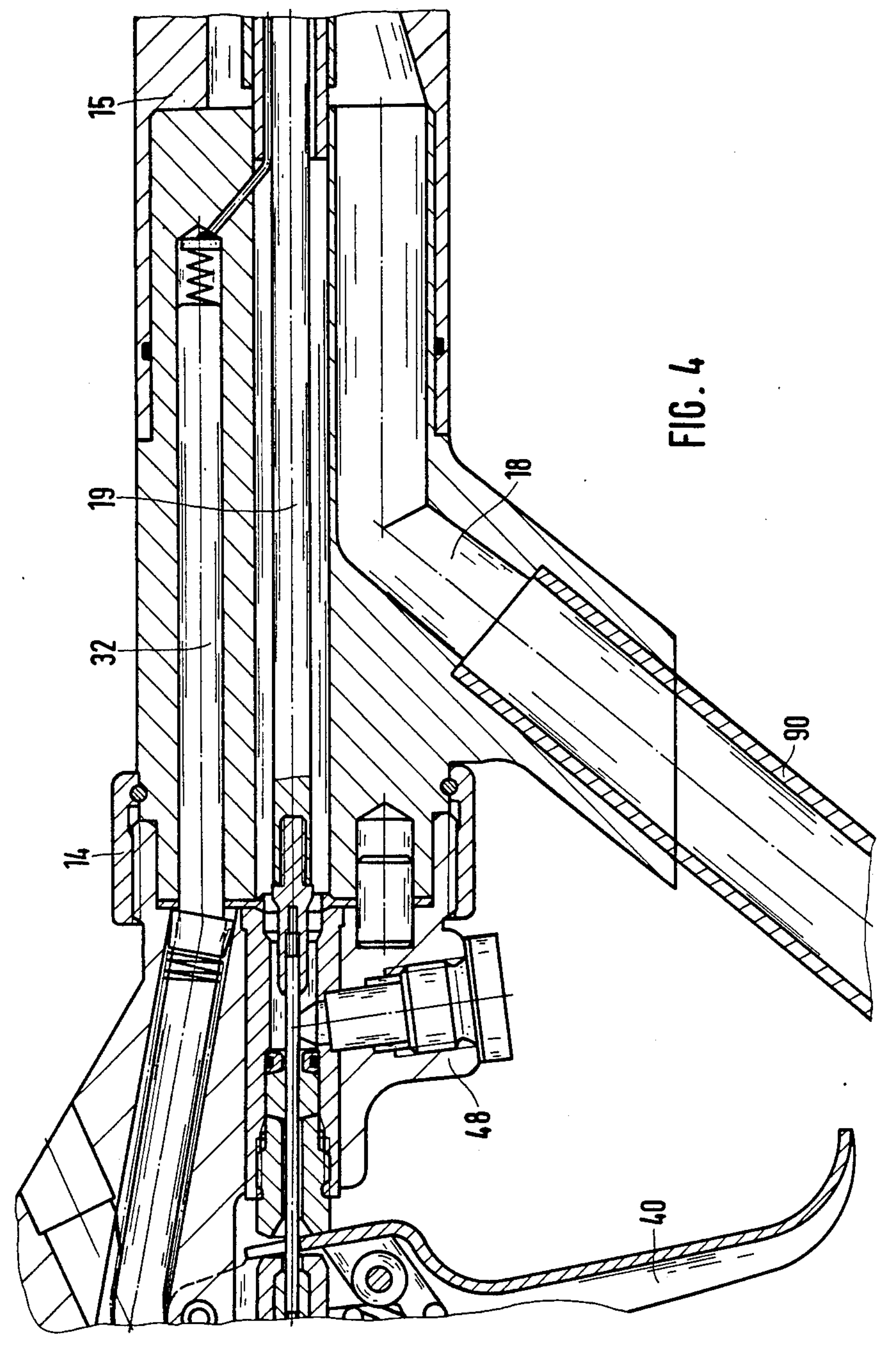
FIG. 4 illustrates a portion of the structure of FIG. 2 with the cup removed and a hose connected fom a remote preparation system.

When, however, a transfer it to be undertaken from the cup mode to a mode wherein the powder-air mixture is supplied from the remote preparation and conveying device, the cup 43 and its cover 44 are removed from the gun. This occurs in that, slightly pressing the two clamp jaws 61 and 62 together, the spring clip 65 is unhooked from the notch 66 and is pivoted away from the tube 15, whereupon the clamp jaws 61 and 62 are then pulled apart against the spring power and the entire unit composed of the cover 43 and the cover 44, together with the conveying tube 45 and the air tube 43 and the clamp mechanism 61, 62, 65, are removed from the powder gun. As a consequence of the removal of the air tube 46 from the seal 49 of the connecting nipple 48 which thereby occurs, the ball 51 is placed against the seal 49 constructed as a valve seat as a consequence of the action of the spring 50 and represents an air-tight closure. The hose 90 (FIG. 4) leading from the aforementioned preparation and conveying device an now be connected to the free intake of the channel 18 and can be secured by way of a standard nipple, sleeve or union nut connection. When the trigger 40 is now pulled into the operating mode, the compressed air supplied from the line 12 can again proceed into the annular space 47 in the manner set forth above, in contrast whereto exit of compressed air from the connecting nipple 48 is suppressed, of course, by the valve 49, 51 which is now closed. Due to the approach of the magnet 80 to the magnetic switch 41, the high-voltage is again turned on. At the same time, however, a discharge valve of the preparation and conveying device (not shown)is opened, so that the same supplies a powder-air mixture which extends via the hose 90 into the channel 18 and into the channel 17 and further proceeds to the mouth of the pistol tube.

Although I have described my invention by reference to a particular illustrative embodiment thereof many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In an electrostatic powder spray gun of the type comprising a pistol body including a handle and trigger, and connections for compressed air and high voltage, a pistol tube secured to the pistol body and having an electrode located at the forward end thereof which is connected to the high-voltage terminal by way of an electrical line passing through the pistol body and the pistol tube, and which a powder channel is provided for a powder-air mixture to be sprayed and extends through the pistol tube and discharges toward the exterior at the forward end thereof, and in which a powder cup is attached to the rear end of the pistol tube and has a conveying tube located therein and entering a lower bore in the powder channel, and in which an air bore is in communication with a compressed air connection by way of a compressed air feed line extending in the pistol body, and in which the powder cup comprising a removable cover which is secured to the pistol tube in an easily-detachable manner, the improvement wherein:

the air bore is an air tube extending through the cover of the powder cup and is secured thereat to act as an injector, the air tube projects beyond the cover, and, when the cover is secured to the pistol tube, projects into a spring-loaded discharge valve of the compressed air feed line and holds the valve in its open position against spring pressure; and said powder channel is adapted for connection to a powder feed line from a remote powder preparation system when said powder cup is detached from said cover.

2. The improved electrostatic powder spray gun of claim 1, wherein:

resilient clamp jaws and a detachable spring clip therebetween are provided for securing said powder cup to said pistol tube.

3. The improved electrostatic powder spray gun of claim 1, wherein:

said discharge valve comprises an elastic valve seat, a spring, and a ball urged toward said valve seat by said spring, whereby said air tube of said powder cup can be plugged through said valve seat in a sealing manner and lifts said ball from said valve seat.

4. The improved electrostatic powder spray gun of claim 3, wherein:

a connecting nipple is provided in the compressed air feed line and includes said discharge valve, and a protective tube surrounds said portion of said air tube which projects beyond said cover.

5. The improved electrostatic powder spray gun of claim 4, wherein:

said powder cup is connected to said pistol tube at a location beneath said pistol tube.

6. The improved electrostatic powder spray gun of claim 5, wherein:

said conveying tube of said powder cup comprises a flow-in opening at its lower end; and said air tube has its injector end extending into said conveying tube in close proximity to the flow-in opening.

7. The improved electrostatic powder spray gun of claim 6, wherein:

said cover of said powder cup and said pistol tube include seating surfaces including an elastic sealing layer therebetween.

8. The improved electrostatic powder spray gun of claim 7, wherein:

a further valve is in communication with said discharge valve and is actuated by said trigger.

9. The electrostatic spray gun of claim 8, and further comprises:

a secondary air line for secondary air extending through said pistol tube and discharging towards the exterior at the forward end thereof, said secondary air line including a branch from the compressed air feed line at a location between said further valve and said discharge valve.

10. The improved powder spray gun according to claim 9, wherein:

a bore extends through said cover and branches from the air tube and discharges into the interior of said powder cup.

* * * * *